Oct. 20, 1925. 1,557,705
G. L. KNOX
TRAILER BRAKE
Filed Oct. 22, 1924 3 Sheets-Sheet 2
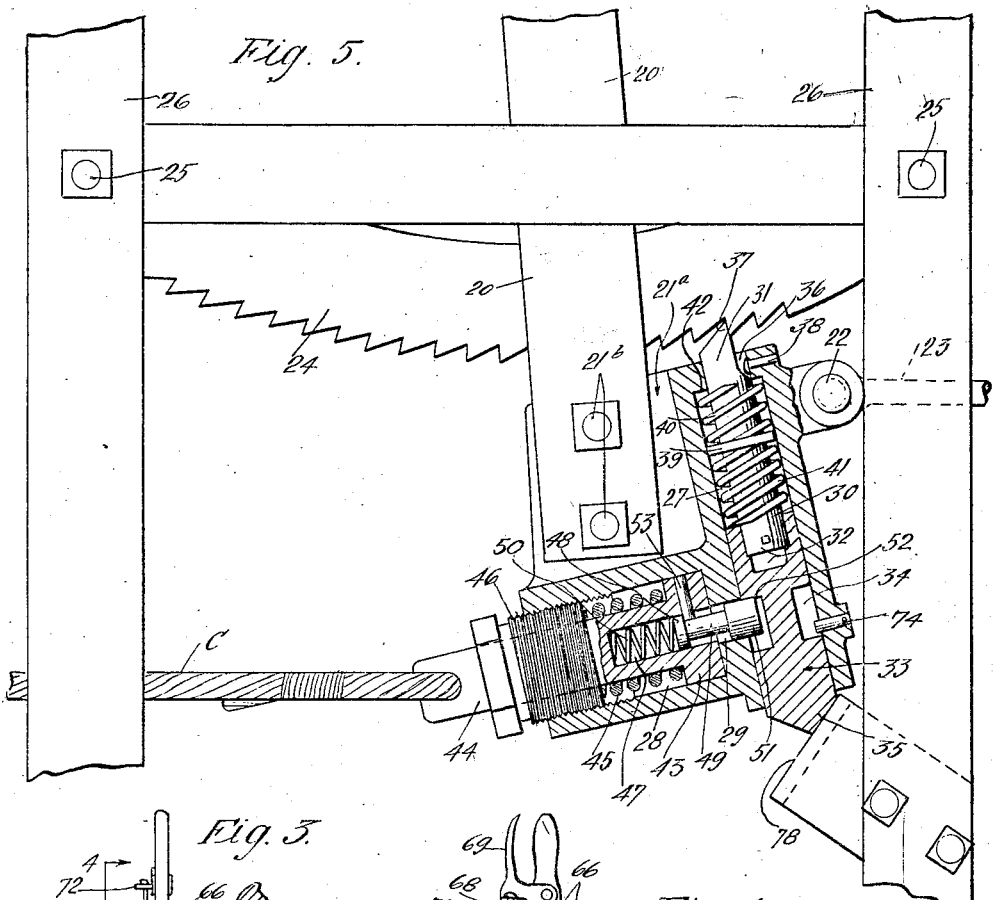
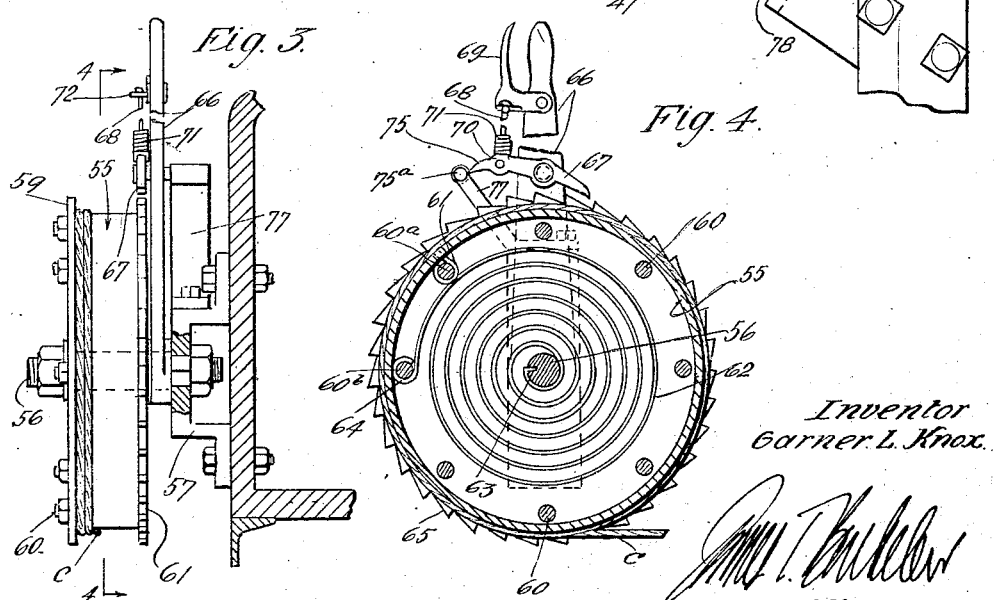
Inventor
Garner L. Knox.
Attorney.

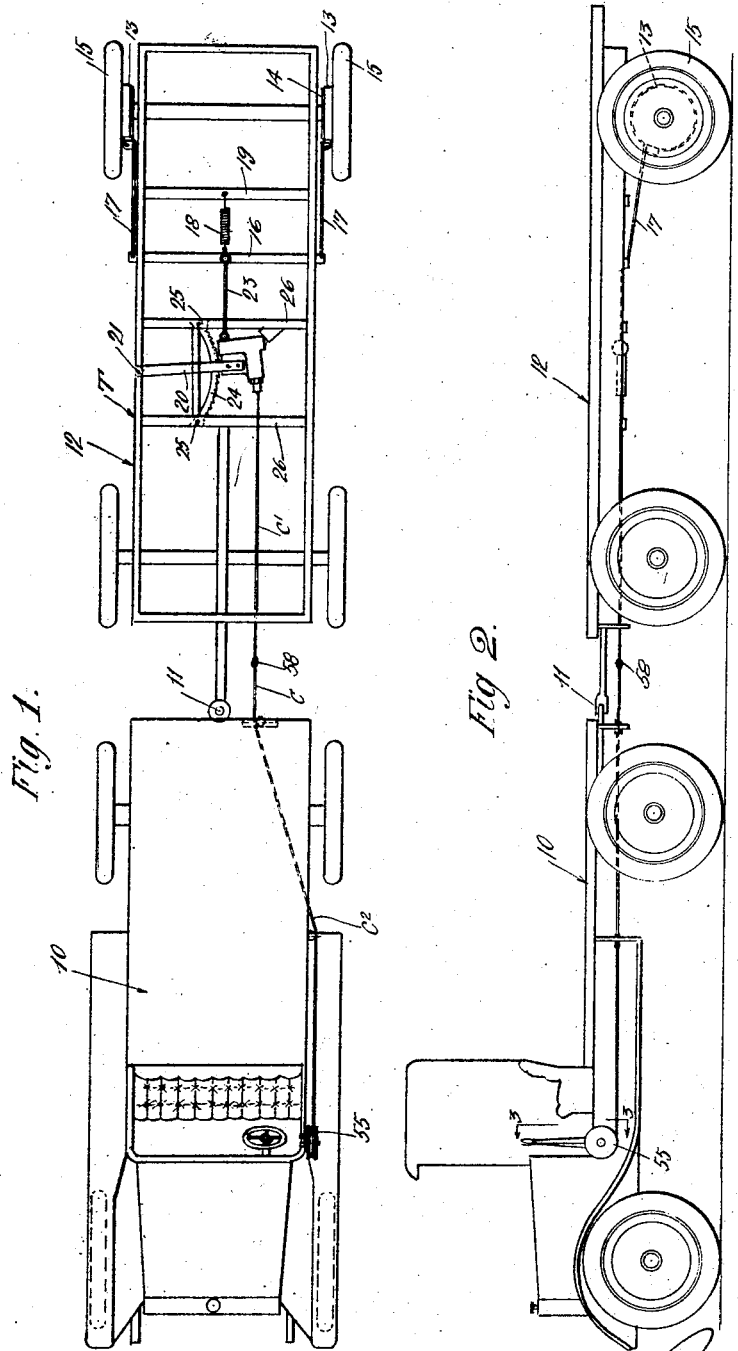

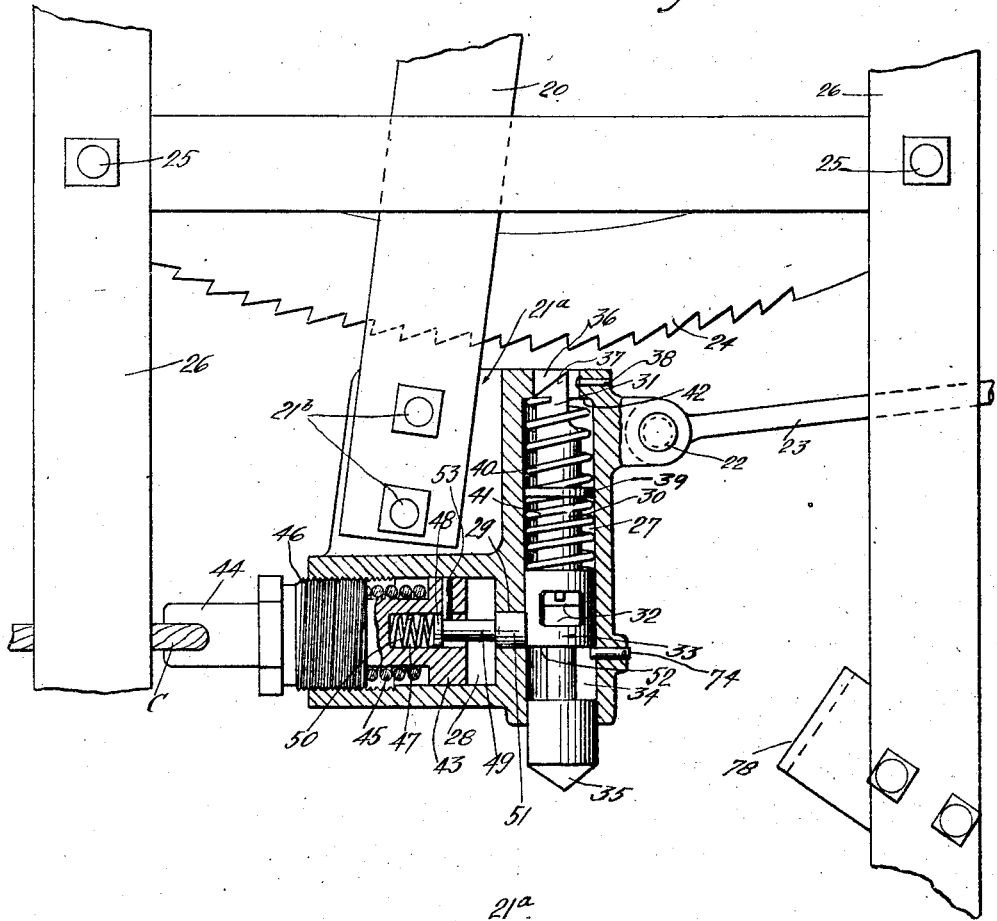
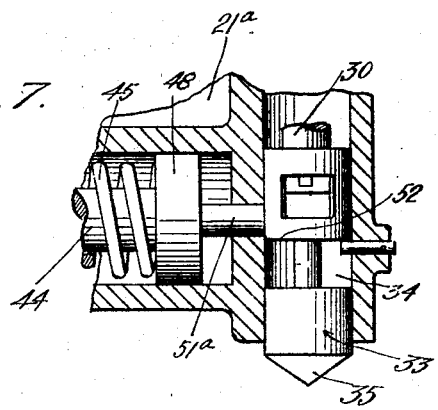

Patented Oct. 20, 1925.

1,557,705

UNITED STATES PATENT OFFICE.

GARNER L. KNOX, OF LOS ANGELES, CALIFORNIA, ASSIGNOR TO UTILITY TRAILER MANUFACTURING COMPANY, A CORPORATION OF CALIFORNIA.

TRAILER BRAKE.

Application filed October 22, 1924. Serial No. 745,131.

*To all whom it may concern:*

Be it known that I, GARNER L. KNOX, a citizen of the United States, residing in Los Angeles, in the county of Los Angeles, and State of California, have invented new and useful Improvements in Trailer Brakes, of which the following is a detailed specification.

This invention relates to vehicle brakes and is more particularly concerned with trailer brakes.

It is well known that each unit in a train of coupled vehicles should be provided with independent braking means, and it is, of course, preferable that said means be controllable from the leading unit. One method of controlling trailer brakes is to carry control cables from trailer carried brake mechanism to a take-up device of the leading vehicle, and to provide releasable locking means on each trailer for holding the individual brake mechanism in set position. While it is a simple matter to set trailer brakes by this method, it is a matter of some difficulty to provide efficient means for releasing them except by the use of an auxiliary cable reaching from the leading vehicle to the releasable locking means on the trailer.

Another difficulty in connection with installations of this character arises from the fact that the coupled vehicles are continually shifting in their relative positions so that the distance between and relative positions of the mechanisms on the leader and trailer are continually changing. Therefore, in order that the flexible cable be always taut enough to insure that the brake mechanism respond immediately to actuating of the controlling mechanism, and that the cable be not overstressed or pulled apart when the various train units have relative separative movement (for instance, when turning corners or when coupling slack is taken up as the train ascends an incline) it is necessary that some provision be made for taking up and paying out the cable. In a co-pending application on brake operating devices for trailers, filed March 31, 1923, Serial No. 629,032, Andrew L. Parrish, inventor, is shown a control device embodying a drum carried by the leading vehicle and having spring means constantly tending to rotate the drum in a manner to maintain the brake applying cable constantly taut but yielding to allow reverse rotation of the drum (to pay out cable) when the vehicles move apart, however slightly. The actuating lever has ratchet connection with the drum so said drum may be positively rotated to take up the cable when the brakes are to be applied, but a second cable, also yieldably held in a taut condition by the drum, is employed for releasing the brake set mechanism on the trailer. It is among the objects of the present invention to provide a trailer carried brake mechanism which may be substituted for the brake mechanism shown in said co-pending application but which has the advantage of being set and released by a single cable. Of course, it is not to be inferred that my invention, in its broader aspects, is limited to use in connection with any particular controlling mechanism carried by the leading vehicle, or even that it is limited in its application to a trailer, for the mechanism may be used in connection with various types of control system or may be mounted on a single vehicle having a self-contained power unit. Or it may be applied to ordinary horse drawn wagons or trucks. When used with a single vehicle, or in certain trailer installations, it is unnecessary that the connection between actuating lever and brake mechanism be flexible, in which situation, the take-up and pay-out drum is unnecessary. However, it will be readily understood that the invention is especially applicable to cable controlled trailer brake mechanism, and therefore, I have illustrated and will describe it as embodied in connection with such mechanism.

I am aware that it is old in the art to provide a single cable between an actuating lever or drum on the leading vehicle and a brake mechanism on the trailer, but so far as I am aware, all devices before mine have been released by a sudden sharp tug on the actuating cable, or by pulling up on the cable and suddenly releasing or slackening it, the locking pawls of the brake setting mechanism being freed from operative engagement from complementary ratchet teeth by such manipulation of the cable. This system is fundamentally weak for, assuming that the brakes are fully or almost fully set, there is ordinarily not sufficient slack left in the cable to allow it to be taken up the additional amount necessary to trip the locking pawl. At best, there is no provision for positively releasing the setting mechanism, and the operator must often snap the cable repeatedly before the locking pawls free themselves from the ratchet teeth.

I provide a swinging brake bar on the trailer, said bar being operatively connected to the trailer brake and there being a spring actuated pawl on the bar adapted to engage a stationary ratchet bar on the trailer. The operating or control cable is yieldably connected to the brake bar and has a trip connection with the pawl so, after the cable has been tensioned beyond that degree necessary to set the brakes, the cable moves with relation to the brake bar and trips the pawl connection. The pawl is then spring urged from operative engagement with the ratchet teeth to free the brake bar and allow brake release. Expressed otherwise, the pawl is tripped when the brake bar offers more resistance to brake setting movement than the yieldable connection between cable and bar offers to cable movement. An adjustment is provided for varying the degree of spring resistance in the yieldable connection between cable and bar, the adjustment thus serving to vary the degree of brake application allowed before the pawl is automatically released.

I also provide a pawl resetting cam whereby it is returned to operative position when the brake bar moves back to starting position.

Other novel features and objects of the invention will be set forth in the following detailed description, reference being had to the accompanying drawings, in which:

Fig. 1 is a plan view of a truck and trailer coupled together, showing my device in connection therewith;

Fig. 2 is a side elevation of Fig. 1;

Fig. 3 is an enlarged section on line 3—3 of Fig. 2;

Fig. 4 is a section, partly contracted, on line 4—4 of Fig. 3;

Fig. 5 is an enlarged plan view, partly in section, of the trailer carried portion of my device, showing it in the position assumed when the brakes are fully released;

Fig. 6 is a view similar to Fig. 5, but showing the device in the position it assumes when the brakes have been set and the locking pawl snapped into released position; and Fig. 7 is a fragmentary view similar to Fig. 6, but showing a modified form of pawl lock.

In the drawings, a leading vehicle 10, hereinafter called a truck, is coupled at 11 in any suitable manner to a towed vehicle 12, hereinafter called a trailer. I have conventionally illustrated the trailer brake mechanism, as it may be of any suitable type; for instance, brake bands 13 may be contracted about drums 14 on rear wheels 15 by drawing equalizer bar 16 towards the front of the trailer, rods 17 connecting the brake band actuating mechanism of wheels 15 to opposite ends of bar 16. Spring 18 extends from bar 16 to cross-bar 19 of trailer frame T and serves to hold the trailer brake and equalizer bar normally in release position. Of course bands 15 and bar 16 may be held in release position by independent springs or the brake and equalizer may be of types other than shown, as the particular type employed is not important to my invention.

The locking mechanism for releasably maintaining the trailer brakes in set position is best shown in Figs. 1, 5 and 6. An operating lever 20 is fulcrumed to frame T at 21, and member 21$^a$ is connected to lever 20 at 21$^b$ and to rod 23 at 22, said rod extending rearwardly to equalizer bar 16. Notched or toothed sector 24 is secured at 25 to frame bars 26, the sector being arched about fulcrum point 21 as a center and being arranged to be traversed by lever 20 when the latter is moved circumferentially. Of course, member 21$^a$ may be integral with lever 20 or rod 23 may be directly connected to said lever without departing from the scope of my invention. It will be readily understood that clockwise movement of lever 20 (as viewed in Figs. 1, 5 and 6) draws equalizer 16 against the action of spring 18 and towards the forward end of the trailer to apply the trailer brakes, and that when lever 20 subsequently becomes free and unrestrained, spring 18 serves to release the brakes, draw equalizer 16 towards the rear of the trailer and swing lever 20 in a counterclockwise direction back to starting position.

Member 21$^a$ carries releasable means for locking the brakes in applied condition and yieldable means for connecting lever 20 and control cable C. The member has angularly disposed bores 27 and 28, there also being a connecting bore 29, preferably of restricted diameter and coaxial with bore 28. Longitudinally slidable through bore 27 is a plunger pawl 30 consisting of a pin 31 having a pin and slot lost motion connection 32 with head 33, said head having an annular groove 34 and a cam end 35, the latter projecting outwardly through the open end of bore 27. Pin 31 extends through restricted bore 36 and its pointed end 37 is adapted to engage the teeth of sector 24. A positioning pin 38 coacts with the flatted side or mutilation of pin 31 to hold said pin against rotation.

Pin 31 has collar 39 against the opposite sides of which bear open springs 40, 41; the opposite end of spring 40 engages shoulder 42 formed at the junction of bores 27 and 36, and the opposite end of spring 41 engages the inner end of pawl head 33. The head 43 of plunger 44 is slidable through bore 28 and is normally held in the position illustrated in Fig. 5 by open spring 45 which encircles the shank of the plunger and is interposed between the head and adjustment nut 46. Plunger 44 has an axial bore 47 through which head 48 of locking bolt 49 is adapted to slide. Spring 50 coacts with bolt 49 in a manner to hold it normally in the extended position illustrated in Fig. 5, in which position bolt head 51 extends through bore 29 and into engagement with shoulder 52 of pawl head 33, pin 53 establishing the limit of full bolt extension. It will be seen that with bolt 49 in extended position, head 33 is incapable of longitudinal, separative movement with respect to member 21ª. Now spring 40 is normally under compression so, but for spring 41, when bolt 49 is in extended position, said spring 40 would tend to telescope pin 31 and head 33 (the extent of telescopic movement being determined by the length of the slot in lost motion connection 32) and disengage the pawl from sector 24. However, spring 41 is of sufficient effective strength to resist this telescopic movement and normally retains pin end 37 in engagement with the sector teeth, though yielding to allow pin 31 to ratchet over the sector teeth when lever 20 is moved in a clockwise direction as viewed in Fig. 5.

Attachment of control cable C is made to lever 20 through plunger 44, it being observed that spring 45 provides for yieldance of this connection.

Actuation of plunger 44 for applying the brakes and for subsequently releasing the locking mechanism which holds the brakes in applied condition, may be accomplished in various manners, all lying within the scope of my invention in its broader aspects, but I will describe the operation of the device through a control cable. Furthermore, there is a certain interaction between the cable actuating mechanism and the cable controlled mechanism which renders them a novel combination, and certain of my claims are drawn to this combination. However, it is not to be inferred that the controlled mechanism is operative and useful only when in such a particular combination.

Cable C extends to a hollow drum 55 (see Figs. 2, 3 and 4) on truck 10, said drum being journaled on a stationary stub shaft 56 which is held to the truck frame by bracket 57. Since it is customary to uncouple trucks and trailers during loading and unloading operations, cable C may be of two parts, C' and C², having a releasable connection 58.

Cover plate 59 is held over the open side of the drum by bolts 60 which extend from the opposite side plate 61. Cable C is preferably given one or more turns about drum 55 and is anchored thereto in any suitable manner; for instance, the cable extremity 61 may be passed through an aperture in the peripheral face of the drum and secured to bolt 60ª within the drum.

Spiral spring 62 is arranged within drum 55, one extremity of said spring being anchored at 63 to stationary shaft 56 and the other extremity being secured at 64 to drum bolt 60ᵇ. When cable C is operatively connected to drum 55 during installation of the device, spring 62 is placed under an initial tension whereby it is adapted to impart a tendency on the part of drum 55 to rotate about shaft 56 in a clockwise direction (as viewed in Fig. 4).

Spring 62 is relatively weak with respect to equalizer spring 18 and plunger spring 45, but is of sufficient strength to compensate for any relative movement between truck and trailer, the spring yielding and taking up during such movement so as to constantly maintain cable C in a comparatively taut condition, whether the brakes be in released or set condition.

Drum 55, or plate 61, is provided with peripheral teeth 65. An actuating lever 66 is journaled on shaft 56 adjacent drum 55 and pivotally supports a driving pawl 67. A connecting rod 68 extends from latch handle 69, pivoted on lever 66, to the tail 70 of pawl 67. Spring 71 encircles rod 68 and is interposed between the lever carried stop 72 and the tail of the pawl, whereby it yieldably holds the pawl out of engagement with teeth 65.

Assume that the trailer brakes are in release position and the operator has occasion to apply them. By including the handle of lever 66 and latch handle 69 in his grasp rod 68 may be lifted against the action of spring 71 to rotate pawl 67 into engagement with teeth 65. By then imparting a clockwise swing to lever 66 (as viewed in Fig. 4) pawl 67 rotates drum 55 in the same direction, thus winding cable C upon the drum. Spiral spring 62 aids rather than resists the described drum rotation.

Cable C thus draws plunger 44 to the left in Fig. 5, and since spring 45 is stronger than equalizer spring 18, there is, at first, little or no separative longitudinal movement between said plunger and member 21ª, lever 20 being swung in a clockwise direction (as viewed in Fig. 5) drawing rod 23 and equalizer bar 16 to the left in Fig. 1 (against the action of spring 18) and applying the trailer brakes.

As lever 20 traverses sector 24, pawl pin 31 ratchets over the sector (spring 41 yielding to allow retraction of the pin as it rides over the teeth inclines) and holds lever 20 from swinging back to release position after the operator has secured the desired degree of brake application. At such a time he may remove his hand from lever 66 to release pawl 67 from the drum teeth. Or if one movement of handle 66 does not suffice to apply the brakes with sufficient force, he may swing said handle back (pawl 31 holding lever 20 from returning to release position while pawl 57 is disengaged from the drum teeth) reengage pawl 57 and rotate drum 55 further.

Now depending upon the adjustment of nut 46, there will come a time during the taking up of cable C when the resistance offered by the brakes to further clockwise rotation of lever 20 will be greater than the resistance offered by spring 45 to longitudinal movement of plunger 44 through bore 28, and when this time arrives (of course nut 46 and spring 45 will be adjusted so such time will ordinarily be after the brakes are more or less fully set) the plunger in its further movement and due to the coaction of pin 53 with head 48 withdraws bolt head 51 from pawl shoulder 52 (see Fig. 6). Thereupon spring 40 acts to shoot pawl 30 to retracted position, that is, out of engagement with the sector teeth. Pin 74 limits the extent of pawl retraction.

Now if the operator is grasping latch handle 69 at the time he pulls cable C sufficiently to withdraw bolts 49, and continues to hold lever 66 so drum 55 cannot rotate in a counterclockwise direction, he is able to hold the trailer brake from going to release position, or by allowing handle 66 to move slowly in a counterclockwise direction, still with pawl 67 engaged, he may gradually relieve the brake application, since spring 45 first moves plunger 44 back to initial position (spring 50 yielding to allow the necessary relative longitudinal movement between the plunger and the bolt 49) and equalizer spring 18 then swinging lever 20 in a counterclockwise direction. Usually, however, it takes more than one oscillation of lever 66 to set up the brakes and subsequently retract bolt 49. Therefore, it is usually necessary that pawl 67 be released from the drum teeth before the drum is free to rotate back sufficiently to release the brakes entirely.

Now after pawl 30 has been disengaged from the sector teeth and before the brakes are released, equalizer spring 18 tends to rotate drum 55 back with sufficient force to retain pawl 67 frictionally in engagement with the drum teeth. This is because of the relative weakness of spring 71. Therefore, I have provided a cam nose 75 on the tail of pawl 67 and during counterclockwise movement of lever 66 this nose is adapted to engage and be depressed by cam bar 75$^a$ supported from bracket 57 and by arm 77, the pawl being thus rotated and withdrawn from engagement with the drum teeth. In normal operation, when the brakes are set and the operator desires to release them, he pulls lever 66 towards him sufficiently to cause retraction of bolt 49 and then immediately releases his hold on the lever. Instantly spring 45 returns plunger 44 to its initial position and equalizer spring 18 acts through the various connecting elements in a manner to rotate drum 55 in a counterclockwise direction and, since pawl 67 is frictionally held in engagement with the drum teeth, lever 66 is also swung in a counterclockwise direction, causing pawl 67 to be freed from the drum teeth by the coaction of cams 75, 75$^a$, and hence allowing the drum to continue in its rotation (without further rotation of lever 66) until the trailer brakes are fully released. Or the operator may manually move lever 66 back until pawl 67 is released by the described cam action.

As bar 20 moves back to starting position, cam 35 of pawl head 33 engages cam member 78 on frame bar 26, and pawl 30 is thereby thrust back to extended position against the action of spring 40. When it reaches this position, spring 50 moves bolt 49 forwardly until head 51 again engages shoulder 52 to lock the pawl releasably in such position.

In Fig. 7 is shown a modified form of pawl lock. Plunger 44 has a rigid extension 51$^a$ (substituted for the relatively movable bolt 49 in the preferred form) adapted to engage shoulder 52 in a manner to lock the pawl releasably in extended position; and such an arrangement lies within the scope of certain of my broader claims. However, the use of member 49 (which may be considered an auxiliary plunger) is preferable in that a relatively weak spring 50 may be employed for biasing it into operative position, while spring 45 is necessarily of considerable strength. In fact, spring 45 must be of such strength that extension 51$^a$ is likely to bear so heavily against the peripheral face of head 34 when in the position of Fig. 6, that it offers excessive resistance to movement of the pawl from retracted to extended position, and would tend to cause excessive wear on head 34 or extension 51$^a$.

Now it might be supposed that when setting up brakes, operators would often inadvertently pull the cable sufficiently to release pawl 30 before such release was contemplated. However, it is found in actual practice that operators soon learn by the "feel" of lever 66 or by the response of the trailer, how far they may take up the cable without tripping the pawl. Or the operators learn by practice that it requires a certain amount of lever movement to set the brakes (or more accurately, to secure the desired degree of brake application, since nut 46 may be so adjusted that spring 45 yields to allow pawl release before the brakes are fully set) and that any lever movement beyond this will trip the brake setting lock.

While I have described and illustrated a preferred embodiment of my invention I do not wish to be limited thereto, for various changes in design, structure and arrangement may be made without departing from the spirit and scope of the appended claims.

Having described a preferred form of my invention, I claim:

1. In a vehicle brake control mechanism, an operating lever operatively connected to the vehicle brakes, a control member operatively connected to the lever for moving it to brake applying position, releasable means for locking the lever in brake applying position, a trip mechanism for holding the locking means normally in operative position, said mechanism being operatively connected to and adapted to be tripped by movement of said control member, and means for moving the locking means to release position when the mechanism is tripped.

2. In a vehicle brake control mechanism, an operating lever operatively connected to the vehicle brakes, yieldable means for maintaining the lever normally in brake release position, a control member operatively connected to the lever and adapted to be moved in one direction to move the lever to brake applying position against the action of said yieldable means, releasable means for locking the lever in brake applying position, a trip mechanism for holding the locking means normally in operative position, said mechanism being operatively connected to and adapted to be tripped by movement of said control member in said one direction, means for moving the locking means to release position when said mechanism is tripped, and means for automatically returning the locking means to locking position and resetting said trip mechanism when said lever is subsequently returned to brake release position by said yieldable means.

3. In a vehicle brake control mechanism, an operating lever operatively connected to the vehicle brakes, a control member operatively connected to the lever for moving it to brake applying position, a locking pawl on the lever and having ratchet engagement with a stationarily mounted member on the vehicle frame, a spring normally tending to urge said pawl out of ratchet engagement with the member, and releasable means operatively connected to the control member for holding said pawl in ratchet engagement against the action of the spring, said means being adapted to be released by movement of the control member to allow the spring to move the pawl positively out of ratchet engagement with said stationary member.

4. In combination with a leading vehicle and a trailer coupled thereto, an operating lever on the trailer and operatively connected to the trailer brakes, brake control means on the leading vehicle, a control cable connecting said control means and said operating lever, yieldable take-up means adapted to coact with said control means in a manner to retain the cable in a taut condition, said control means being movable in a manner to take up the control cable positively and thereby move the operating lever to brake applying position, releasable means for locking the lever in brake applying position, a trip mechanism for holding the locking means normally in operative position, said mechanism being operatively connected to and adapted to be tripped by movement of the control member, and means for moving the locking means to release position when the mechanism is tripped.

5. In a vehicle brake control mechanism, an operating lever operatively connected to the vehicle brakes, a control member attached to but capable of relative movement with respect to the lever, releasable means for locking the operating lever in brake applying position, means operatively connecting the control member and locking means and operable for releasing the locking means by movement of the control member with relation to the lever, yieldable means for resisting relative movement between the control member and lever whereby movement of the control member in one direction is adapted to move the lever to brake applying position until the resistance offered by the brakes to further lever movement is greater than the resistance offered by said yieldable means and whereby further movement of the control member is adapted to operate said lock releasing means, and means for moving the locking means to release position when said releasing means is so operated.

6. In a vehicle brake control mechanism, an operating lever operatively connected to the vehicle brakes, a control member attached to but capable of relative movement with respect to the lever, releasable means for locking the operating lever in brake applying position, means operatively connecting the control member and locking means and operable for releasing the locking means by movement of the control member with relation to the lever, adjustable and yieldable means for resisting relative movement between the control member and lever whereby movement of the control member in one direction is adapted to move the lever to brake applying position until the resistance offered by the brakes to further lever movement is greater than the resistance offered by said yieldable means and whereby further movement of the control member is adapted to operate said lock releasing means, and means for moving the locking means to release position when said releasing means is so operated.

7. In a vehicle brake control mechanism, an operating lever operatively connected to the vehicle brakes, a control member attached to but capable of relative movement with respect to the lever, releasable means for locking the operating lever in brake applying position, means operatively connecting the control member and locking means and operable for releasing the locking means by movement of the control member with relation to the lever, yieldable means for resisting relative movement between the control member and lever whereby movement of the control member in one direction is adapted to move the lever to brake applying position until the resistance offered by the brakes to further lever movement is greater than the resistance offered by said yieldable means and whereby further movement of the control member is adapted to operate said lock releasing means, means for moving the locking means to release position when said releasing means is so operated, and means adapted to return the locking means to locking position when said control member is moved in the opposite direction.

8. In a vehicle brake control mechanism, an operating lever operatively connected to the vehicle brakes, a control member attached to but capable of relative movement with respect to the lever, releasable means on the operating lever and adapted to cooperate with a member stationarily mounted on the vehicle frame for locking the operating lever in brake applying position, means operatively connecting the control member and locking means and operable for releasing the locking means by movement of the control member with relation to the lever, yieldable means for resisting relative movement between the control member and lever whereby movement of the control member in one direction is adapted to move the lever to brake applying position until the resistance offered by the brakes to further lever movement is greater than the resistance offered by said yieldable means and whereby further movement of the control member is adapted to operate said locking releasing means, and means for moving the locking means to release position when said releasing means is so operated.

9. In a vehicle brake control mechanism, an operating lever operatively connected to the vehicle brakes, a control member attached to but capable of relative movement with respect to the lever, releasable means on the operating lever and adapted to cooperate with a member stationarily mounted on the vehicle frame for locking the operating lever in brake applying position, means operatively connecting the control member and locking means and operable for releasing the locking means by movement of the control member with relation to the lever, yieldable means for resisting relative movement between the control member and lever whereby movement of the control member in one direction is adapted to move the lever to brake applying position until the resistance offered by the brakes to further lever movement is greater than the resistance offered by said yieldable means and whereby further movement of the control member is adapted to operate said lock releasing means, means for moving the locking means to release position when said releasing means is so operated, and cam means stationarily mounted on the vehicle frame and adapted to cooperate with the locking means in a manner to return said locking means to locking position when said control member is moved in the opposite direction.

10. In a vehicle brake control mechanism, an operating lever operatively connected to the vehicle brakes, a control member attached to but capable of relative movement with respect to the lever, releasable means for locking the operating lever in brake applying position, means operatively connecting the control member and locking means and operable for releasing the locking means by movement of the control member with relation to the lever, yieldable means for resisting relative movement between the control member and lever whereby movement of the control member in one direction is adapted to move the lever to brake applying position until the resistance offered by the brakes to further lever movement is greater than the resistance offered by said yieldable means and whereby further movement of the control member is adapted to operate said lock releasing means, spring means for moving the locking means to release position when said releasing means is operated, and cam means stationarily mounted on the vehicle frame adapted to engage the locking means and return it to locking position against the action of said spring means when said control member is moved in the opposite direction.

11. In a vehicle brake control mechanism, an operating lever operatively connected to the vehicle brakes, a control member attached to but capable of relative movement with respect to the lever, releasable means on the operating lever and having ratchet engagement with a member stationarily mounted on the vehicle frame for locking the operating lever in brake applying position, means operatively connecting the control member and locking means and operable for releasing the locking means by movement of the control member with relation to the lever, yieldable means for resisting relative movement between the control member and lever whereby movement of the control member in one direction is adapted to move the lever to brake applying position until the resistance offered by the brakes to further lever movement is greater than the resistance offered by said yieldable means and whereby further movement of the control member is adapted to operate said lock releasing means, means for moving the locking means out of ratchet engagement with said stationary member when said releasing means is so operated, and means stationarily mounted on the vehicle frame and adapted to engage and return the locking means into ratchet engagement when said control member is moved in the opposite direction.

12. In a vehicle brake control mechanism, an operating lever adapted to traverse a stationary element on the vehicle frame, said lever having angularly disposed communicating bores, a pawl longitudinally slidable through one of the bores, a member slidable through the other bore and adapted to extend into engagement with the pawl for holding it in ratchet engagement with the stationary element, yieldable means adapted to hold said member in such engagement with the pawl, means for moving the member out of engagement with the pawl, and means for moving the pawl out of engagement with the stationary element when the member is out of engagement with the pawl.

13. In a vehicle brake control mechanism, an operating lever adapted to traverse a stationary element on the vehicle frame, said lever having angularly disposed, communicating bores, a pawl longitudinally slidable through one of the bores, a member slidable through the other bore and adapted to extend into engagement with the pawl for holding it in ratchet engagement with the stationary element, adjustable and yieldable means adapted to hold said member in such engagement with the pawl, means for moving the member out of engagement with the pawl, and means for moving the pawl out of engagement with the stationary element when the member is out of engagement with the pawl.

14. In a vehicle brake control mechanism, an operating lever adapted to traverse a stationary element on the vehicle frame, a pawl comprising a pin and head capable of limited telescopic movement, spring means adapted to maintain the pin and head relatively extended, a slidable plunger adapted to engage the head for holding the pawl in ratchet engagement with a stationary element on the vehicle, means for sliding the plunger out of engagement with said head, and spring means for moving the pawl out of engagement with the stationary element when the plunger is moved out of engagement with the head.

15. In a vehicle brake control mechanism, an operating lever adapted to traverse a stationary element on the vehicle frame, a pawl comprising a pin and head capable of limited telescopic movement, spring means adapted to maintain the pin and head relatively extended, a slidable plunger angularly disposed with respect to the pawl, a bolt telescopically arranged with respect to the plunger, spring means adapted to urge the bolt to extended position and into engagement with said head to hold the pawl in ratchet engagement with a stationary element on the vehicle, and means for withdrawing said bolt from engagement with said head.

16. In a vehicle brake control mechanism, an operating lever adapted to traverse a stationary element on the vehicle frame, a pawl comprising a pin and head capable of limited telescopic movement, spring means adapted to maintain the pin and head relatively extended, a slidable plunger adapted to engage the head for holding the pawl in ratchet engagement with a stationary element on the vehicle, and means for sliding the plunger out of engagement with said head.

17. In a vehicle brake control mechanism, an operating lever operatively connected to the vehicle brakes, releasable means for locking the lever in brake applying position, and a pull member operatively connected to the lever and locking means, said pull member being operable to move the operating lever to brake applying position and to release the locking means when the resistance of the lever to further movement exceeds a predetermined amount.

18. In a vehicle brake control mechanism, a releasable locking device operatively connected to the vehicle brakes for retaining brake application, and means for automatically releasing the locking device when the brakes are set beyond a predetermined degree.

19. In a vehicle brake control mechanism, brake applying means operatively connected to the vehicle brakes, a single control member operable for actuating the applying means, a releasable locking device for retaining brake application, and means operatively connected to the locking device and to the control member for automatically releasing the locking device when the brakes are set beyond a predetermined degree.

In witness that I claim the foregoing I have hereunto subscribed my name this 9th day of October 1924.

GARNER L. KNOX.